Aug. 2, 1960  L. O. CARLSEN ET AL  2,947,223
GEAR MACHINE OR THE LIKE
Filed July 2, 1956  7 Sheets-Sheet 1

INVENTORS
LEONARD O. CARLSEN
ADOLPH H. KRASTEL
HERMAN A. MALE
BY Richard W. Treverton
ATTORNEY

Aug. 2, 1960    L. O. CARLSEN ET AL    2,947,223
GEAR MACHINE OR THE LIKE
Filed July 2, 1956    7 Sheets-Sheet 4

United States Patent Office 2,947,223
Patented Aug. 2, 1960

2,947,223

GEAR MACHINE OR THE LIKE

Leonard O. Carlsen, Rochester, Adolph H. Krastel, Irondequoit, and Herman A. Male, Brighton, N.Y., assignors to The Gleason Works, Rochester, N.Y., a corporation of New York Filed July 2, 1956, Ser. No. 595,281

16 Claims. (Cl. 90—5)

The present invention relates to a machine for cutting gears and like toothed parts, especially but not exclusively spiral bevel and hypoid gears.

One object of the invention is a machine which will be more rigid and compact than conventional machines having an equivalent range of adjustment, and hence will be capable of withstanding higher cutting rates. A related object is an arrangement wherein the cutter head of the machine is adjustable along inclined ways on a cross-slide on the machine frame and the work head is adjustable on a second cross-slide movable parallel to the first, by which arrangement both vertical and horizontal relative adjustments between the two heads can be effected in a machine of relatively small width.

A further object is an arrangement of machine elements in which the main drive motor is mounted directly in a cutter head with respect to which the cutter has a rotational motion, and in which this same motor effects other drive functions of the machine, such as relative depth feed between the cutter and workpiece, intermittent indexing of the workpiece to bring successive tooth spaces thereof into position for cutting, and depth feed of a tooth-end chamfering cutter. A still further but related objective is an arrangement whereby the indexing and chamfering cutter-feed functions are effected by means of a hydraulic drive, eliminating the necessity for mechanical drive connections between major components of the machine which must be adjustable relative to each other.

Still further objectives are improved means for adjusting the work head relative to a sliding base which supports it, and for adjusting the sliding base relative to a hydraulic actuator which moves it on the machine frame between an advanced or cutting position and a retracted or loading position.

The foregoing and other objects and advantages will appear from the following description of the preferred embodiment of the invention that is shown in the accompanying drawings, wherein:

Figure 1:
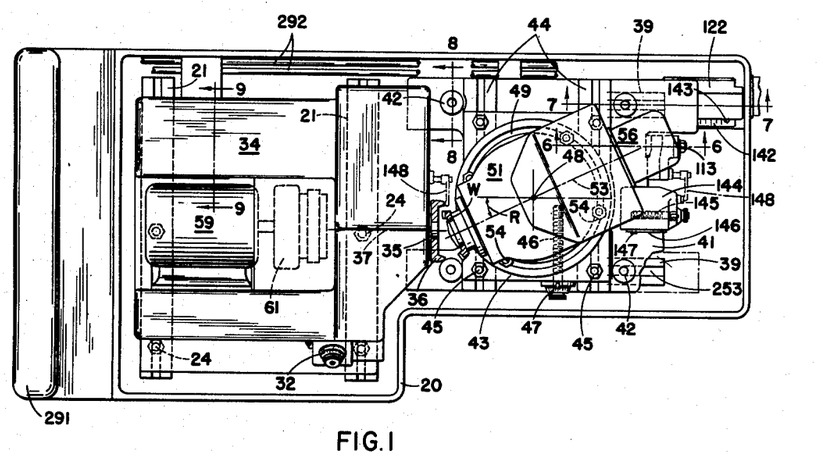
Figs. 1 and 2 are respectively a plan view and a front elevation of the machine.
Figure 2:
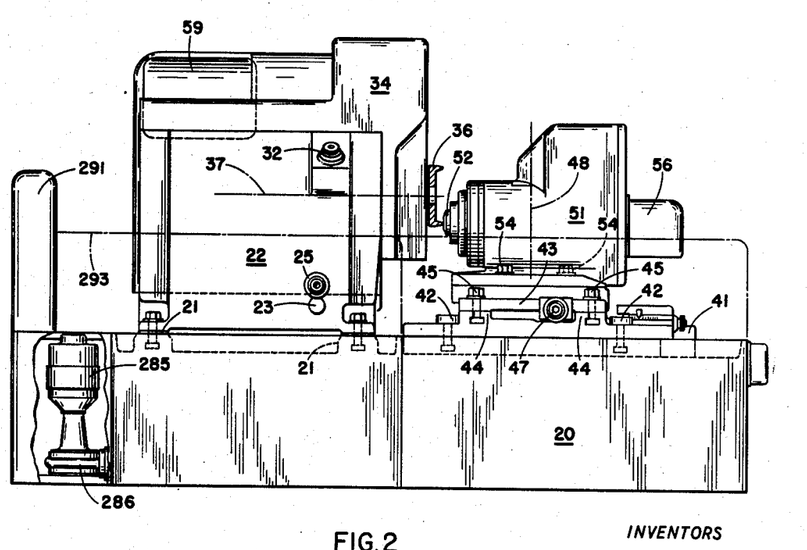
Figure 3:
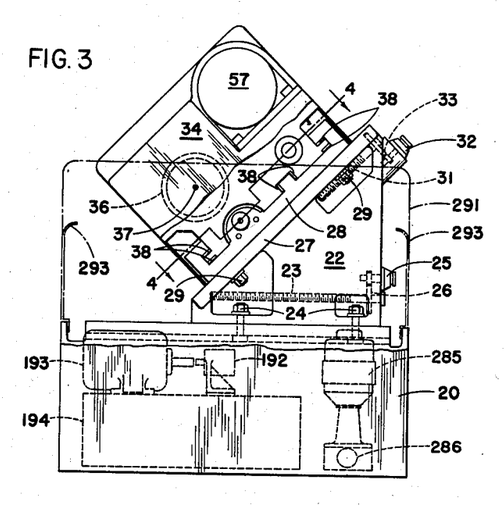
Fig. 3 is an end view of the machine with certain parts broken away.

Referring to Figs. 1–3, the machine comprises a frame 20 having horizontal ways 21 along which a cutter head cross-slide 22 is adjustable by means of a screw 23 after clamp bolts 24 are first loosened. The screw may be turned by means of a wrench applied to a calibrated dial 25 which is connected to the screw by reduction gearing 26. On the cross-slide are inclined ways 27 which extend at an acute angle to the horizontal and support for adjustment therealong a cutter-head base 28. In the particular embodiment that is illustrated this angle is 45 degrees. The base 28 is clamped to cross-slide 22 by bolts 29 and, upon loosening of the latter, may be adjusted by a screw 31 which is rotated by turning a calibrated dial 32 to which it is connected by reduction gearing 33. On the base 28 is mounted the cutter head 34 in which there is journaled for rotation a spindle 35 for cutter 36. This cutter preferably is a bladed face-mill cutting tool, although it may be of any other suitable type, for example a cup-shaped abrasive wheel. The axis of rotation of the cutter spindle is designated 37. This axis is horizontal and is perpendicular to the directions in which cross-slide 22 and base 28 are adjustable. The cutter head 34 is supported on base 28 by linear roller bearings 38, shown also in Fig. 4, for motion in the direction of cutter axis 37. This motion is employed to feed or advance the cutter into the workpiece, in this case bevel gear W, and to withdraw it to permit tooth-to-tooth indexing of the workpiece.

The frame 20 has horizontal ways 39 along which a sliding base 41 is movable in the direction of cutter axis 37 to advance and retract the workpiece W from a loading position to a cutting position and return. During actual cutting the sliding base is clamped to the frame by hydraulically actuated clamps 42. A work head cross-slide 43 is adjustable on the sliding base along ways 44 which are parallel to ways 21. Such adjustment is effected by first loosening clamp bolts 45, and then turning an adjusting screw 46 which has a calibrated dial 47. Adjustable on cross-slide 43 angularly about a vertical axis 48, on circular way 49 on the cross-slide, is work head 51 in which spindle 52 carrying workpiece W is journaled for rotation about a horizontal axis 53. This axis intersects the vertical axis 48. After such adjustment the work head may be clamped to the cross-slide 43 by bolts 54. The workpiece is chucked on the work spindle 52 and clamped to the work head 51 by a suitable chuck and by a hydraulic clamp 55, Fig. 15. These preferably are like those disclosed in patent application Serial No. 556,725, filed December 30, 1955. The chuck is actuated by a hydraulic piston and cylinder unit 56 on the outer end of the work spindle. Contained within the work head is an indexing mechanism for the work spindle of the kind disclosed in patent application Serial No. 595,254, filed on even date herewith by Leonard O. Carlsen and Adolph H. Krastel entitled "Index Mechanism for a Gear Machine or the Like," Patent No. 2,898,780, August 11, 1959. This mechanism includes a reciprocating fluid motor 57, Fig. 15, which is driven by and in time with a reciprocating pump 58 mounted in the cutter head.

Figure 13:
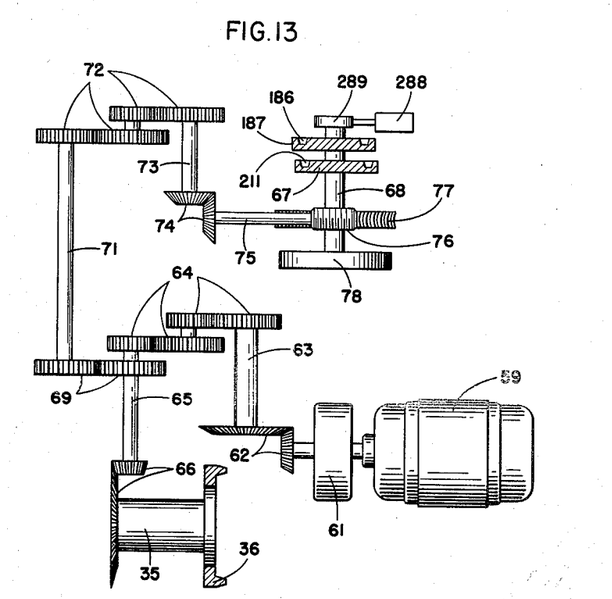
Fig. 13 is a diagram showing the main drive motor and the parts of the machine driven mechanically thereby.

This index drive pump 58 and the cutter 36 are actuated by an electric motor 59 mounted on the cutter head. As shown in Fig. 13, the motor drives the cutter through a magnetic clutch-brake unit 61, bevel gear 62, shaft 63, cutter speed change gears 64, shaft 65, bevel gears 66 and cutter spindle 35. The index drive pump 58 is actuated by a cam 67 on a shaft 68 which is driven from shaft 65 through gears 69, shaft 71, cycle-time change gears 72, shaft 73, bevel gears 74, shaft 75, worm 76, and worm-wheel 77 on shaft 68. All of these shafts, 63, 65, 71, 73, 75 and 68, are journaled in the cutter head.

Figures 4, 5:
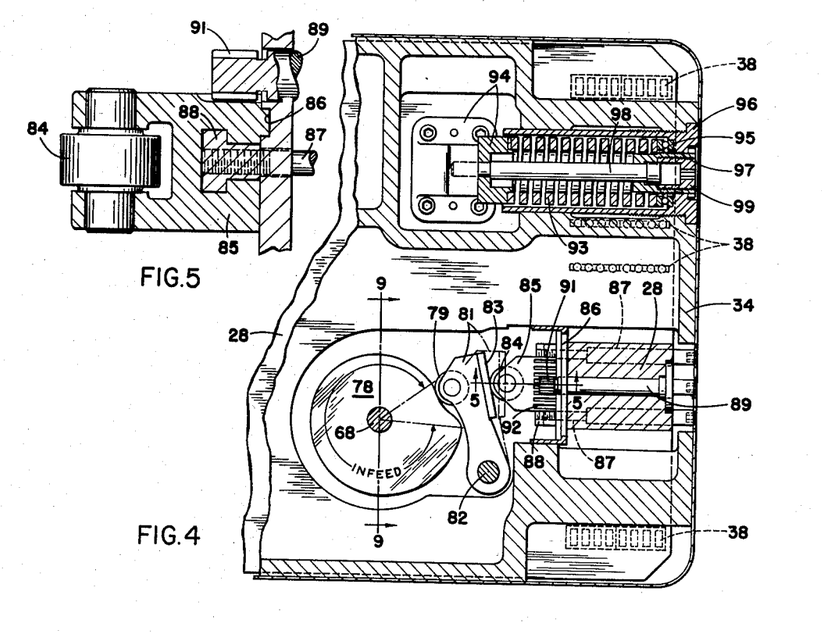
Fig. 4 is an inclined view through the cutter head of the machine, in the plane 4—4 of Fig. 3.
Fig. 5 is a detail sectional view in plane 5—5 of Fig. 4.
Figure 6:
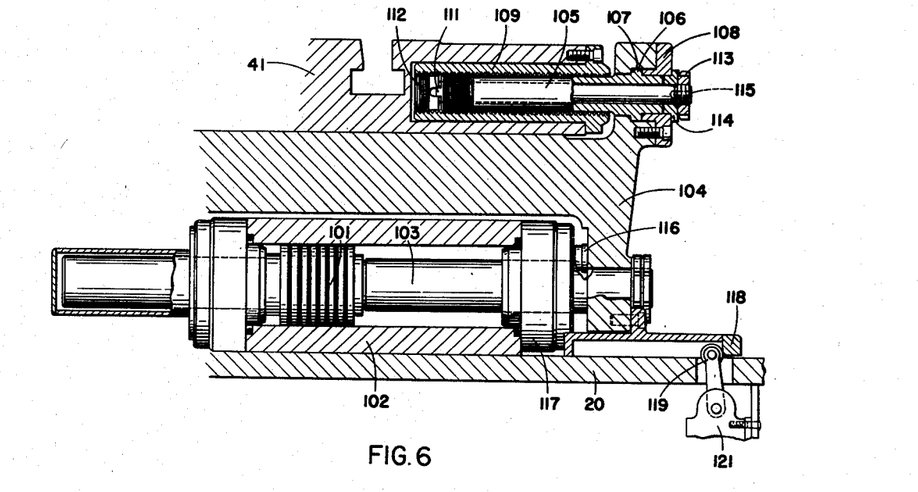
Figs. 6, 7 and 8 are detail vertical sectional views respectively in the planes 6—6, 7—7 and 8—8 of Fig. 1.

Referring to Fig. 4, a cam 78 is provided on shaft 68 for reciprocating the cutter head on base 28 to alternately feed the cutter into the workpiece and return it to a position clear of the workpiece so that indexing may take place. The cam engages a follower roller 79 on a lever 81 which is pivoted to the cutter head by pin 82. The lever has a plane surface 83 engaging a roller 84 whose axis is stationary with respect to the base 28. The roller is carried by a bracket 85 which is adjustable, vertically in Fig. 4, along way 86 on the base 28. After such adjustment the bracket is clamped to the base by tightening screws 87 within nuts 88. The adjustment is effected by turning a shaft 89 which is rotatable in the base and has on its inner end a pinion 91 meshing with rack teeth 92 on the bracket. By this adjustment, which moves roller 84 toward or away from pivot pin 82, the effective length of lever 81 can be varied to change the magnitude of the feed motion effected by the cam 78. The plane surface 83 is perpendicular to the cutter axis 37 and the direction of feed motion when the cutter head is advanced. Thus the adjustment of roller 84 does not affect the advanced position of the cutter, although it does change its withdrawn position.

The rollers 84 and 79 are constantly held against lever 81 and cam 78 by a compression spring 93 which acts between the base and the cutter head to urge the latter toward its retracted position. One end of the spring bears against a bracket 94 secured to the base while the other end bears on an anti-friction thrust bearing 95 supported by a retainer 96 that is screw-threaded into the cutter head. To hold spring 93 compressed when it is desired to replace cam 78, a nipple 97 is screw-threaded to the cutter head, the nipple having a shoulder for engaging the head of a stud 98 which is anchored to the base. A plug 99 threaded into the nipple may be reversed, end for end, to clamp the head of the stud to the nipple when it is desired to secure the cutter head to the base 28. This may be desirable under certain circumstances: for example if a cutter of the circular broach type is substituted for face mill cutter 36 so that the function of feed cam 78 is to be omitted.

Referring now to Figs. 1, 2, 6, 7 and 14, the sliding base 41 is actuated by a piston 101 arranged to reciprocate in a cylinder 102 secured to the frame 20. The piston rod, 103, is secured to a bracket 104 which is slidably adjustable upon the sliding base by means of an adjusting screw 105. This screw is of tubular form and has a flange 106 confined between a shoulder 107 of the bracket and a cap 108 that is secured to the bracket. The inner end of the screw is threaded to a sleeve 109 secured to the sliding base and has a transverse key 111 engaged in a keyway formed in a screw 112. The latter is also threaded into sleeve 109 and has its shank extending through the screw 105. To the outer end of the screw 112 is threaded a nut 113 which retains a washer 114. By means of a wrench applied to a socket 115 in the end of screw 112 the latter may be rotated after nut 113 has first been loosened. Because of the key 111, the screws 112 and 105 rotate in unison and, depending upon the direction of rotation, effect adjustment of the sliding base to the right or left relative to the bracket 104. After such adjustment has been made the nut 113 is retightened, which draws screw 112 to the right in Fig. 6, thereby taking up any backlash between screws 112 and 105 and sleeve 109, and also drawing flange 107 and washer 114 together to take up any backlash between screws 112 and 105 and the bracket 104.

It will thus be seen that the advanced limit position of sliding base 41, to the left in Figs. 1, 2, 6, 7 and 14, is established by the adjustment effected by screw 105 and by the motion of piston 101 to the left, the latter motion being limited by the abutment of a button 116 on bracket 104 with cylinder head 117. When this limit position is reached an abutment 118 on bracket 104 engages actuating element 119 of a normally open limit switch 121 to close the switch contacts 121a and 121b, Fig. 10.

Figure 7:
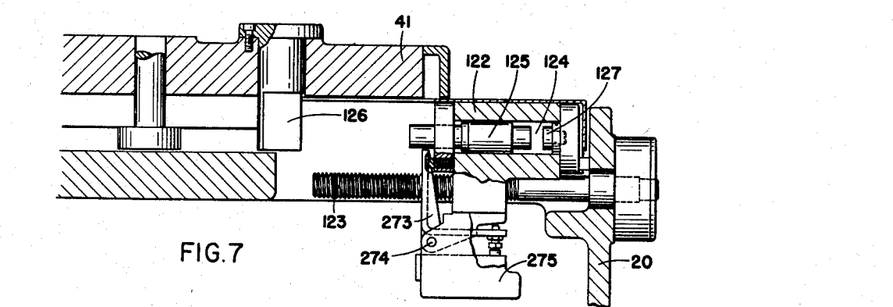
Figure 8:
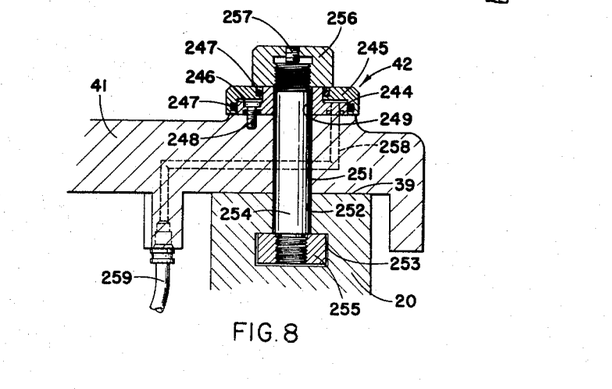
Figure 14:
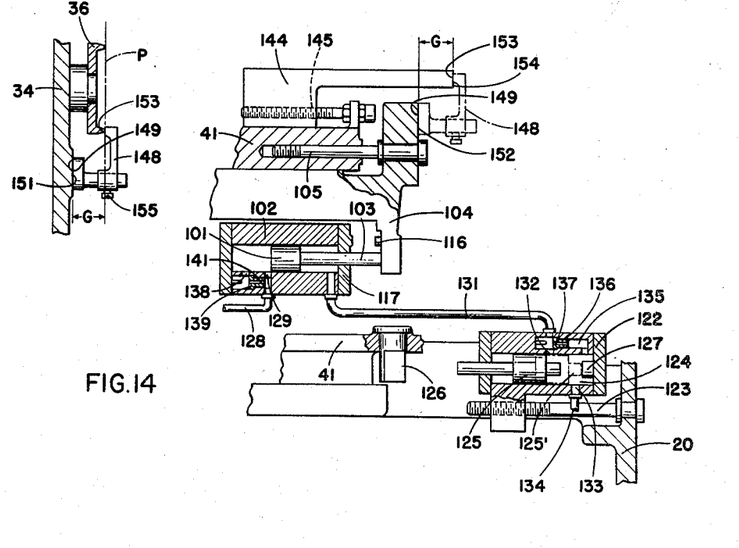
Fig. 14 is a schematic view illustrating the relationship between a cutter gage and the control mechanism for the sliding base shown in Figs. 6, 7 and 8; and, Fig. 15 is a diagram of the hydraulic system of the machine.

The retracted limit position of the sliding base is established by the adjustment of a stop slide 122, Figs. 1, 7 and 14, this stop slide being movable on the frame 20 by means of an adjusting screw 123. Slidable in a cylinder 124 in the stop slide is a piston valve 125 whose outer end is engageable by an abutment 126 on the sliding base 41 and whose inner end is adapted to abut a stop button 127 on the stop slide.

The sliding base is retracted by fluid under pressure entering the left end of cylinder 102 through a conduit 128 and port 129, and moving the piston 101 to the right, while fluid from the right chamber of the cylinder is allowed to exhaust through a flexible conduit 131 and a port 132 into the right end of cylinder 124 from which it exhausts through a port 133 and flexible conduit 134. As the sliding base approaches its retracted position its stop 126 engages the piston valve 125 and moves it to the right. When the piston valve reaches broken-line position 125′, just before it abuts stop 127, it closes port 132 and thus serves to check the terminal motion of the sliding base. A by-pass 135 connecting conduit 131 with valve cylinder 124 contains a check valve 136 that is closed upon exhaust flow from cylinder 102 through conduit 131; but a bleed passage 137 through the valve allows a restricted flow from the conduit into the valve cylinder. Thus while fluid can continue to exhaust from cylinder 102 through conduit 131 until the sliding base reaches its limit position the restriction imposed by bleed passage 137 results in the terminal part of the motion being at low velocity.

Advance of the sliding base is effected by fluid under pressure entering the right end of cylinder 102 through conduit 134, valve cylinder chamber 124, and conduit 131. Flow in this direction opens check valve 136 so that by-passage 135 is unobstructed. Furthermore, as the sliding base advances, the piston valve 125 is moved to the left by pressure in the right end of chamber 124, and thus opens port 132. The final part of the advance of the sliding base is checked by piston 101 covering port 129 so that fluid displaced from the left chamber of cylinder 102 must flow into conduit 128 through a by-passage 138. This by-passage contains a check valve 139 which is closed by flow of fluid from cylinder 102 into conduit 128 but has a bleed passage 141 therethrough. This check valve opens when the flow of fluid is from conduit 128 into the cylinder.

The adjustments which establish the advanced and retracted positions of the sliding base, respectively the adjustment of bracket 104 by screw 105 and the adjustment of stop 122, 127 by screw 123, are made in accordance with (a) the design of the particular gear to be cut and (b) the location of the cutter tip plane P, Fig. 14. This location may vary from cutter to cutter and also changes as a cutter is sharpened. The gear design factor, (a) above, is determined by calculation and is ordinarily given to the machine operator on a summary of machine settings. A scale 142, Fig. 1, is mounted on the frame 20 and a cooperating pointer 143 on the stop slide 122, so that the operator can readily adjust the stop slide in accordance with this factor on the summary. By such adjustment the root plane of every workpiece W, i.e. the plane cut by the tip edges of the cutter which lie in plane P, will be brought to the same position when the sliding base is withdrawn, regardless of the design of the particular workpiece. Also for introducing the factor (a)

into the set up of the machine, a summary slide 144 is mounted adjustably on the sliding base 41. The slide 144 is adjusted by means of a screw 145 and is provided with a scale 146 which is identical with scale 142 and cooperates with a pointer 147 on the sliding base. For introducing factor (b), a two-part adjustable-length gage 148 is provided. This gage has a face 149 for seating either on surace 151 of the cutter head 34 or on surface 152 of bracket 104, and a face 153 for contacting either a blade tip edge (in plane P) of cutter 36 or surface 154 of the summary slide 144. In setting up the machine, the operator places the gage on cutter head surface 151 and adjusts it to such length, G in Fig. 14, that its surface 153 touches the tips of one or more cutter blades in plane P. While so adjusted the parts of the gage are clamped together by tightening set screw 155. Next the gage is transferred, to position its surface 149 on surface 152 of bracket 104. Then screw 105 is adjusted to bring the bracket 104 into such relation to sliding base 41 that surface 154 touches gage surface 153 and the latter is therefore at distance G from surface 152. This assures that when the sliding base is advanced, so that button 116 abuts cylinder head 117, the cutter will cut the workpiece to the calculated or design depth when the cutter head 34 is fully advanced by cam 78.

Figure 11:
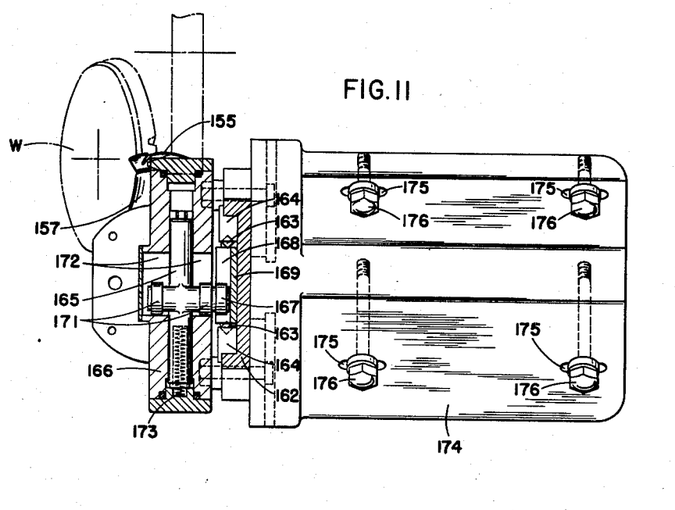
Figs. 11 and 12 are respectively a rear elevation and an end view of the chamfering mechanism of the machine, certain parts being broken away in each view and appearing in section, a part of Fig. 11 being in vertical section in plane 11—11 of Fig. 12.
Figure 12:
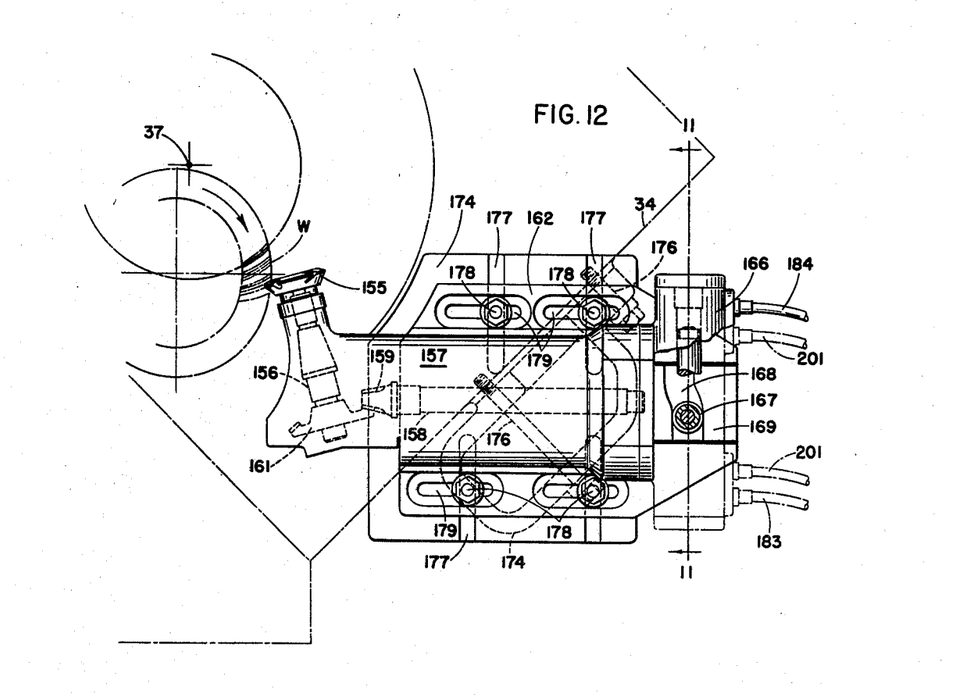
Figure 15:
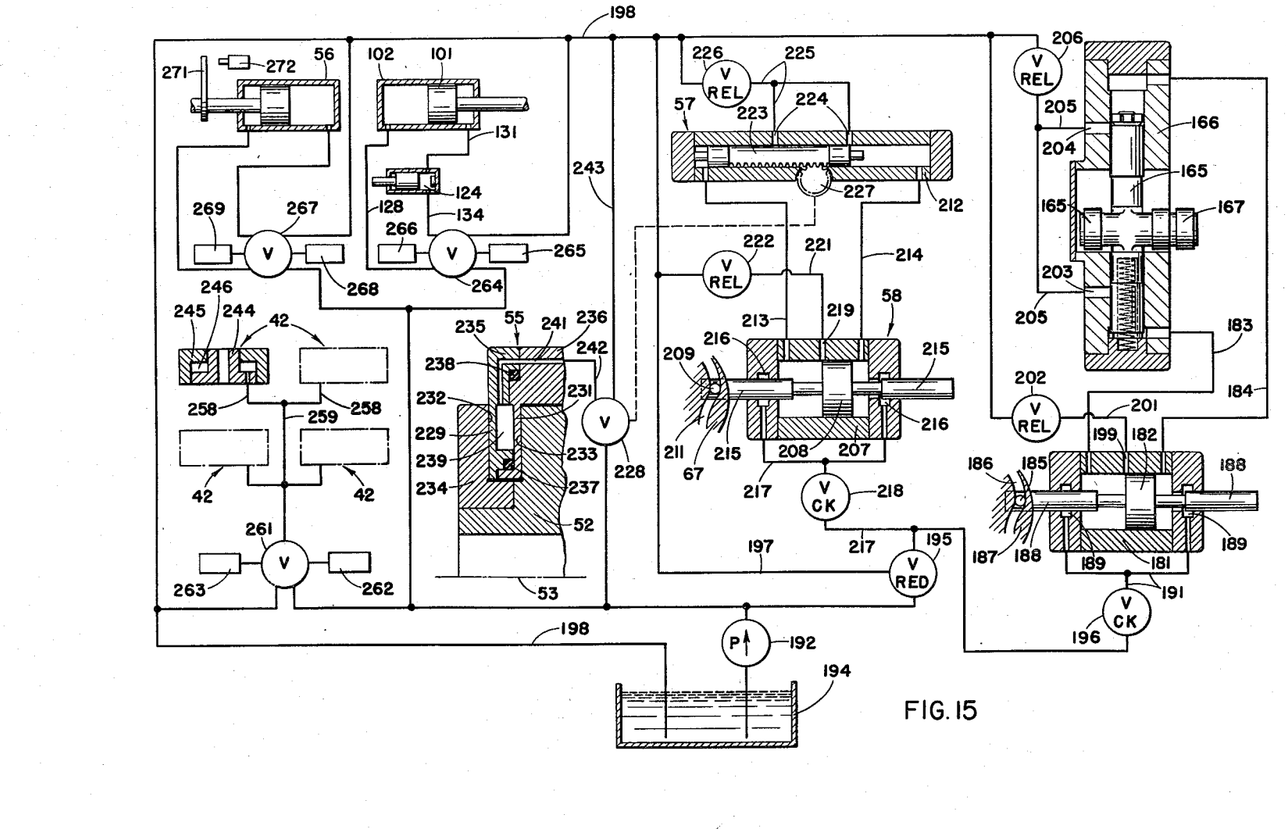

The chamfering mechanism, Figs. 11, 12 and 15, is mounted on the cutter head 34 and employs a milling cutter 155 to chamfer the sharp or acute-angled edges at the large ends of the teeth of gear W. The cutter is secured to a spindle 156 which is journaled for rotation in a chamfering head 157 containing a motor 158 whose armature shaft has a pinion 159 in driving engagement with a gear 161 on the spindle. The head 157 constitutes a slide supported on a plate 162 by means of roller bearings 163 which engage in horizontal opposed V-grooves formed in the head and in horizontal ways 164 on the plate. For effecting such sliding motion a piston 165 is arranged to reciprocate vertically in a cylinder 166 that is mounted on the chamfering head; and a roller 167 carried by the piston engages in a cam slot 168 in a cam member 169 secured to plate 162. Coaxial with roller 167 are two rollers 171 which are also carried by the piston and engage in vertical guide slots 172 of the cylinder block. The piston is reciprocated by differential hydraulic pressures applied against its opposite ends, but a spring 173 is provided to return it to its uppermost position in case of hydraulic failure. The arrangement is such that as the piston descends in the cylinder 166 the roller 167, guided vertically by rollers 171, acts against cam 168, 169 to move to the left in Fig. 12 the assembly comprising the cylinder, the head 157 and the cutter 155, thereby feeding the cutter depthwise into the workpiece. Upon ascent of the piston the roller acts against the cam to move the assembly to the right, thus withdrawing the cutter 155 to a position clear of the workpiece.

To enable the device to chamfer workpieces of different sizes and shapes, the above-described assembly, including plate 162, is adjustable on cutter head 34 in three mutually perpendicular directions, i.e. horizontally in Fig. 11 and horizontally and vertically in Fig. 12. For this purpose there is provided a bracket 174 having horizontally elongated openings 175 for passing screws 176 which serve to attach the bracket to the cutter head. The bracket has vertical T-slots 177 slidably retaining bolts 178 which serve to secure the plate 162 to the bracket and which extend through horizontal slots 179 in the plate. With this arrangement, the plate 162 may be adjusted horizontally and vertically in Fig. 12 when the nuts or bolts 178 are loosened, and, when screws 176 are loosened the bracket may be adjusted horizontally in Fig. 11, i.e. in the direction of the axis 37 of the cutter spindle 35.

Figure 9:
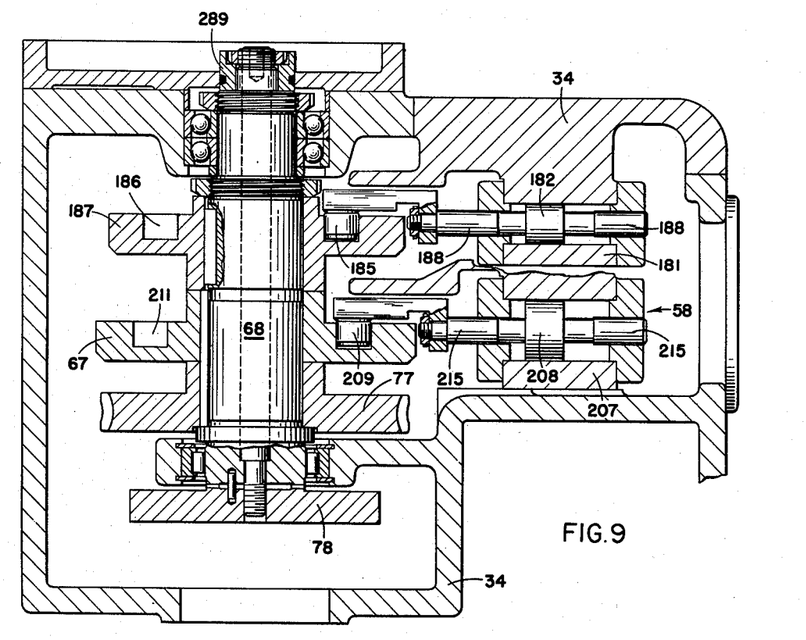
Fig. 9 is a vertical cross-sectional view through the cutter head in the plane 9—9 of Figs. 1 and 4.

The reciprocating motor 165, 166 of the chamfering device is operated by a hydraulic system of the kind disclosed in co-pending application Serial No. 595,255, filed on even date herewith by Leonard O. Carlsen, Adolph H. Krastel and Edward Quincey, entitled "Hydraulic Motion Transmitting System," Patent No. 2,882,685, April 21, 1959. The system includes a pump comprising a cylinder 181 and piston 182, opposite ends of the cylinder being connected by conduits 183 and 184 to the opposite ends of cylinder 166, as shown in Fig. 15. On the piston is a roller 185 engaging in a groove 186 in one end face of a cam 187 secured to shaft 68, Figs. 9 and 13, the shape of the cam being such that the piston is reciprocated back and forth once for each revolution of the shaft. The piston has valve parts 188 adapted to uncover ports 189 at the ends of the piston strokes. These ports communicate via a conduit 191 with the discharge side of a pump 192 driven by a motor 193 (see also Fig. 3), the suction side of this pump being connected to a sump 194 in the lower part of the frame 20. In conduit 191 is interposed a pressure reducing valve 195, which serves to maintain a desired pressure in conduit 191, and a check valve 196. Excess fluid discharged by the reducing valve is returned to the sump via exhaust conduits 197 and 198. Pump cylinder 181 also has a port 199 which is uncovered by the piston 182 at the end of each of its strokes. This port communicates with the sump through a conduit 201, a pressure relief valve 202 and exhaust conduit 198. Similarly the motor piston 165 at the conclusion of alternate strokes respectively uncovers ports 203 and 204 in cylinder 166. These ports communicate with sump 194 via conduits 205, a relief valve 206, and exhaust line 198.

As the rotating cam 187 moves piston 182 to the right in Fig. 15, the port 199 is closed and fluid is displaced from the right chamber of cylinder 181 and through conduit 184 into the upper chamber of cylinder 166, thereby lowering the piston 165 and acting through the roller 167 to advance the chamfering slide 157, moving it to the left in Fig. 12. Due to the shape of cam 168, 169, Fig. 12, the part of the stroke of piston 165 required for actually feeding the chamfering cutter 155 into full depth, i.e. to complete the chamfering of one tooth of the workpiece, is concluded well before the piston concludes its down stroke. It is also before the right valve part 188 of the pump piston uncovers its port 189. After this port has been opened the downward stroke of piston 165 is completed by fluid flow from pump 192 through passages 191 and 184. When the lower terminal position of piston 165 is reached, port 204 is uncovered, so that flow from pump 192 continues until such time as the cam 187 effects the return stroke of piston 182. During the return stroke, to the left, fluid displaced from pump 181, 182 through hydraulic line 183 causes an up stroke of piston 165 which results in the chamfering tool being withdrawn to a position clear of the workpiece. The terminal part of this up stroke, which begins with uncovering of left port 189 and when port 203 is uncovered, occurs after the tool is fully withdrawn and is effected by pressure produced by pump 192. During each stroke of piston 165 the fluid displaced thereby flows through hydraulic line 183 or 184 into cylinder 181. The terminal portion of the stroke of piston 165, occurring after piston 182 has completed its stroke, results in this fluid being exhausted through port 199, conduit 201 and relief valve 202. The back pressure maintained by this relief valve serves to check the piston as it reaches the end of each stroke.

The shape of cam track 186 and its phase relationship to cutter feed cam 78, Figs. 4 and 13, and to indexing cam 187, are such that the cutting action of chamfering cutter 155 take place while the main cutter 363 is being fed depthwise into the workpiece and that the chamfering cutter is withdrawn clear of the workpiece while the latter is being indexed as a result of the piston of pump 58 being moved to the right by cam 67.

In order to permit motion of the cutter head 34 and the chamfering slide 157 relative to the frame 20, at least parts of the conduits 183, 194, 191, 201 and 205 are of flexible tubing.

The hydraulic drive for the index motor 57 is a substantial duplicate, in both design and function, of that for the chamfering motor 165, 166, described above. It comprises a pump having a cylinder 207 and a piston 208 on whose outer end is a roller 209 engaged in cam groove 211 of cam 67. The opposite ends of the pump cylinder are connected to the opposite ends of cylinder 212 of the index motor by conduits 213 and 214. The pump piston has valve parts 215 which respectively uncover ports 216 when the piston is in its terminal positions, to admit fluid that is discharged from pump 192 through pressure regulating valve 195 and a conduit 217 in which a check valve 218 is interposed. A central exhaust port 219 in the cylinder 207 is uncovered by piston 208 at the end of each stroke and communicates through a conduit 221 and pressure relief valve 222 with the exhaust line 198 to sump 194. Similarly the piston 223 of motor 57 when in its terminal position uncovers exhaust ports 224 in cylinder 212 which leads to the sump 194 through conduit 225, a pressure relief valve 226 and conduit 198.

The cam groove 211 is so shaped and in such phase relationship to feed cam 78 and chamfering cam 187, Fig. 13, that the pump piston 208 is moved to the right in Fig. 15, to cause the motor piston 223 to move to the left, for indexing of the work spindle, after the feed cam has caused the cutter head to be withdrawn and the chamfering cam has withdrawn the chamfering slide. The indexing stroke of the pump and motor 208, 223 is effected during a relatively small fraction of a revolution of cam 67, while the return stroke is slower since it does not cause any motion of the workpiece or otherwise interfere with the cutting operation.

On the motor piston 223 there are rack teeth engaging a pinion 227 which is connected to a reversing valve 228 which controls the hydraulic device 55 which clamps the work spindle to work head 51 except when indexing is taking place. The connection between the pinion and the valve and the operation of the valve may be like those described in aforementioned application, entitled "Index Mechanism for a Gear Machine or the Like." The clamp 55 which is of a kind disclosed in patent application Serial No. 556,725, filed December 30, 1955, comprises an expansible annular formation having relatively thin resilient side walls 229 and 231 engageable respectively with side walls 232 and 233 of an annular groove formed in the work spindle 52, including end ring 234 thereof. Side walls 229 and 231 are respectively integral with ring-shaped sections 235 and 236 of the work head 51, and at their inner peripheries have overlapping flanges sealed by a flexible O-ring 237. A similar seal 238 is provided between sections 235 and 236. Fluid pressure is applied to the chamber 239 between the flexible walls 229 and 231 through a passage 241 and a connecting hydraulic line 242 controlled by the valve 228. During the indexing stroke of piston 223 the valve 228 connects line 242 to an exhaust line 243 which leads through conduit 198 to sump 194, to thereby relieve walls 229 and 231 of pressure against walls 232, 233. However at all other times the valve connects line 242 to the pressure or discharge side of pump 192, so that pump pressure is applied to chamber 239 for clamping the flexible walls 229 and 231 against walls 232, 233 of the spindle, thereby holding the latter against rotation in the work head.

Each of the sliding base clamps 42, Figs. 1, 2, 8 and 15, comprises concentric inner and outer rings 244 and 245, which are of L-shape in cross-section and complement each other to provide an expansible annulus of substantially rectangular cross-section. The chamber between these rings, designated 246, is sealed by O-rings 247 which are disposed in grooves formed in the internal cylindrical surfaces of the outer ring 245 and engage the external cylindrical surfaces of the inner ring 244. The latter ring is secured to the sliding base 41 by screws 248 and has its central opening 249 aligned with a bore 251 in the sliding base and the neck 252 of a T-slot 253 which extends along the way 39. A screw 254 extending through the aligned openings 249, 251 has secured to its lower end a nut 255 which is retained in the T-slot. A cap nut 256 threaded to the upper end of screw 254 is locked thereto by a screw-threaded plug 257 and rests on the upper surface of outer ring 245. Hydraulic pressure may be applied to the chamber 246 through a passage 258 which communicates through a flexible conduit 259 and a reversing valve 261 either with the discharge side of pump 192 or with the exhaust line 198 leading to sump 194. The valve is operated by solenoids 262 and 263. When solenoid 262 is energized, the valve is operated to apply pressure to chamber 246 to clamp the sliding base to the way 39; and when solenoid 263 is energized the valve is reversed to release the clamps.

The hydraulic system shown in Fig. 15 further includes a reversing valve 264 operated by solenoids 265 and 266 for controlling the sliding base actuator 101, 102. When solenoid 265 is energized the valve 264 connects the hydraulic line 134 to the discharge side of pump 192 and line 128 to the exhaust line 198; and when solenoid 266 is energized the valve is reversed, connects line 128 to the pressure side of the pump and line 134 to exhaust. Accordingly hydraulic pressure is applied to the piston 101 to advance the sliding base 41, i.e. move it to the left in Figs. 1, 2, 14 and 15, when solenoid 265 is energized and to withdraw the sliding base when solenoid 266 is energized. Similarly there is a reversing valve 267 operated by solenoids 268 and 269 for controlling the hydraulic chuck actuator 56. When solenoid 268 is energized this valve connects the left chamber of the actuator cylinder to the pressure side of the pump 192 and the right chamber to exhaust line 198, to thereby cause the actuator piston to move to the right, actuating a suitable chuck (not shown) on the work spindle 52 to clamp the workpiece thereto. When solenoid 269 is energized the valve 267 reverses the pressure and exhaust connections to the actuator and thereby causes dechucking of the workpiece.

Figure 10:
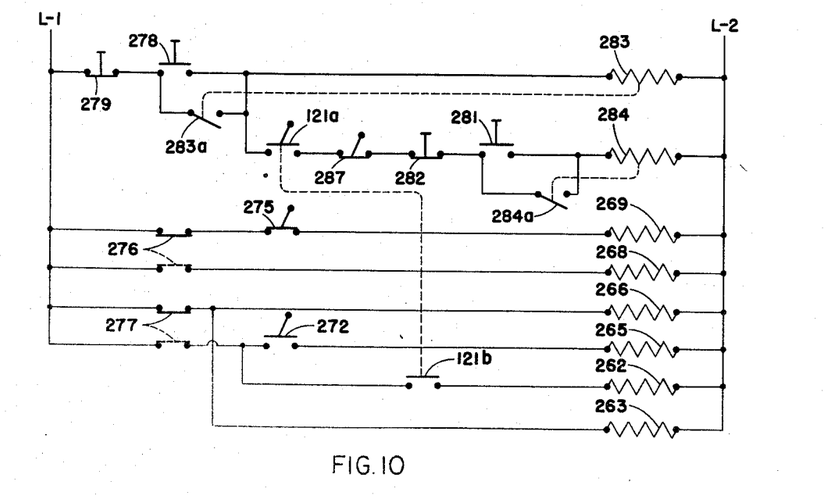
Fig. 10 is a wiring diagram of the machine.

When the piston of the chuck actuator 56 has completed its chucking motion, an abutment 271 engages and closes a limit switch 272, Figs. 10 and 15. Similarly when the sliding base 41 has been moved to its withdrawn limit position by actuator 101, 102, the pin 126, Fig. 7, engages a bellcrank lever 273 which is pivoted at 274 to stop member 122 and through the lever closes a normally open limit switch 275 which is also mounted on the stop member 122.

The system further includes a manually operated two-position switch 276 for controlling the chucking mechanism, a similar manually operated two-position switch 277 for controlling the sliding base, push button type stop and start switches 278 and 279, respectively, for the hydraulic pump motor 193, Figs. 3, and push button type stop and start switches 281 and 282 for the main drive motor 59. There is also a controller 283 for the pump motor, this controller having a movable contact 283a which closes to shunt start switch 278 when the controller is energized; and a controller 284 for the main drive motor 59. This controller 284 has a movable contact 284a which closes to shunt switch 281 when the controller is energized. Controller 284 also controls chamfering motor 158 and a motor 285, Fig. 2, which drives a coolant circulating pump 286, Figs. 2 and 3. This pump draws coolant from a sump in the frame 20 and discharges it through a conduit, not shown, over the surfaces of the cutter and workpiece in the area in which cutting takes place.

An automatic stop switch 287, arranged in series with controller 284 for motor 59, is actuated by a suitable counting device, not shown, that is controlled by a limit switch 288, Fig. 13. This limit switch is operated by a cam 289 on shaft 68. The cam is of such design that on each revolution thereof, representing the cutting of one tooth space on the workpiece, the switch 288 is momentarily closed to send an electrical impulse to the counting device. When the total number of such impulses equals the number for which the counting device is set, corresponding to the number of tooth spaces to be cut, the switch 287 is automatically opened and the counting device automatically reset to zero.

The motor controllers and solenoid operated valves are contained in a control cabinet 291 mounted on one end of frame 20, and from this cabinet there extends along the inside of the frame a manifold 292 containing rigid sectons of the several conduits that extend to the hydraulic parts carried by the work head 51, including chuck actuator 56, sliding base actuator 101, 102, and hydraulic index motor 212. From this manifold extends the respective flexible sections of these conduits which have been referred to hereinbefore. Extending around the periphery of and detachably supported by the frame 20 is a multi-section guard 293 which, since it forms no part of the present invention, is shown only in outline by broken lines in Figs. 2 and 3.

Prior to operation, the machine is set to calculated settings depending upon the design of the work gear W that is to be cut. The height of the cutter axis 37 with respect to the gear axis 53 is adjusted by moving the cutter head base 28 along inclined ways 27 of cross-slide 22, by means of adjusting screw 31. The relative positions of axis 37 and vertical axis 48 in a horizontal plane, is adjusted by moving either or both of the cross-slides 22 and 43 by means of their respective adjusting screws 23 and 46. The magnitude of these adjustments of the cross-slides depends, of course, not only upon the horizontal distance to be established between axes 37 and 48 but also on the magnitude of the horizontal component of adjustment of the cutter head base along inclined ways 27 employed to obtain the vertical adjustment of axis 37. By reason of there being the two cross-slides 22 and 43, the desired range of horizontal and vertical adjustment is obtainable without unduly increasing the width of the machine, i.e. its vertical dimension in Fig. 1. As will be seen from Fig. 3, the arrangement is such that the load represented by the mass of the cutter head is applied vertically through the cutter head base 28 and cross-slide 22 to the machine frame. Because of this the machine is inherently more rigid than an equivalent machine of conventional design, since in the conventional design the work head is mounted for vertical adjustment on a column on the frame with the result that its center of mass overhangs the column by a considerable amount, requiring that the column be designed to resist heavy bending loads as well as compressive loads. With the illustrated forty-five degrees inclination of ways 27 the horizontal component of adjustment of axis 37 relative to cross-slide 22 equals the vertical component of such adjustment, making for ease of calculation. However, if a lesser inclination should be used the relationship between the horizontal and vertical components can be readily determined by calculation or by the use of suitable tables or scales.

The work head 51 is adjusted on cross-slide 43 about vertical axis 48 in accordance with the root-angle of the workpiece, angle R in Fig. 1. The summary slide 144 is adjusted on the sliding base 41, and the stop member 122 is adjusted on the frame, in accordance with the calculated distance between the root plane of the workpiece and the vertical axis 48, measured in the directon of axis 37. By this adjustment of the stop member, the position of the root plane of workpiece, when the sliding base is withdrawn, may always be the same, irrespective of the design of the workpiece. The bracket 104 is adjusted relative to the sliding base by means of adjusting screw 105. In making this adjustment the gage 148 is employed in the manner heretofore described, with the result that the work gear W will be cut to the correct root plane irrespective of the height of the blades of the cutter 36. Finally, the roller 84 may be adjusted, vertically in Fig. 4, to provide whatever amount of axial feed motion of the cutter may be needed.

The operation of the machine will now be summarized, with reference especially to Figs. 10 and 15. In the starting position the several switches will be in the condition shown in Fig. 10, the motors stopped, the sliding base withdrawn, the clamps 42 released, the chuck actuator in dechucked position, and the index piston 223 is in its limit position to the left in Fig. 15 and the valve 228 is positioned to connect hydraulic line 242 to the pressure side of pump 192 so that upon running of pump the work spindle clamp 239 will be applied. The operator momentarily closes switch 278, establishing a circuit through controller 283 between leads $L_1$ and $L_2$ which are connected to a suitable source of electrical energy. Accordingly the motor 193 operates hydraulic pump 192. Contact 283a closes and hence the motor 193 will continue to run until stopped by opening of stop switch 279. A blank workpiece W is placed on the chuck on the work spindle 52 and the switch 276 is moved to "chuck" position, i.e. down in Fig. 10, closing a circuit from $L_1$ to $L_2$ through solenoid 268. This operates valve 267 to apply hydraulic pressure to the left cylinder chamber of chuck actuator 56, Fig. 15, causing the workpiece to be chucked. At the conclusion of the chucking action the abutment 271 closes switch 272. Next the operator moves switch 277, downwardly in Fig. 10, to establish a circuit from $L_1$ to $L_2$ through solenoid 265. This solenoid then operates valve 264 to apply hydraulic pressure to the right chamber of cylinder 102, causing the sliding base 41 to be advanced to bring the workpiece into cutting position, although not yet contacting the clutter which at this time is retracted by spring 93 and cam 78. When this position is reached the limit switch contacts 121a and 121b close. Closing of 121b establishes a branch circuit through solenoid 262, which immediately operates valve 261 to apply pressure to clamps 42, thereby clamping the sliding base to the frame.

Now the start switch 282 is momentarily closed, and, since switch contacts 283a, 121a and 287 have been closed, a circuit is established from $L_1$ to $L_2$ through controller 284 to cause main drive motor 59, the chamfering motor 158 and coolant pump motor 285 to operate and to close contact 284a so that the subsequent opening of switch 282 is without effect. The motor 59 drives the cam shaft 68, Fig. 13, through a number of revolutions corresponding to the number of tooth spaces to be cut on the workpiece, and during each such revolution the following sequence takes place: The cam 78 first swings the lever 81 clockwise in Fig. 4, this causing it to react against the stationary roller 84 to advance the cutter head 34 to the left (to the right in Figs. 1 and 2), to feed the cutter to full depth into the workpiece. On continued turning of the cam the spring 93 acts to withdraw the cutter head, to move the cutter clear of the workpiece, and restore the lever 81 to the position shown in Fig. 4. The roller 79 then rides on a dwell portion of the cam for the remainder of the revolution of shaft 68.

As the cam 78 advances the cutter head, the cam 187 simultaneously acts to move the pump piston 182 to the right in Fig. 15, causing a down stroke of motor piston 165 which feeds the now-rotating chamfering cutter 155 into the workpiece. This is followed by a cam-effected return stroke of pump piston 182 which withdraws the chamfering cutter clear of the work by the time the cutter 36 has been retracted. During the remainder of the revolution of shaft 68 a dwell portion of cam 78 holds the piston 182 in its left limit position.

As soon as the cutter 36 is retracted the cam 67 acts to move pump piston 208 to the left in Fig. 15, to move index motor piston 223 to the right. As this action proceeds, first the valve 228 is operated to reverse the connections of hydraulic pressure and exhaust lines to line 242 so that the work spindle clamp 55 is released. Then the work spindle is rotated by the index mechanism through an angle corresponding to one pitch of the workpiece, thus bringing the next tooth space of the workpiece into position for cutting. Finally the valve 228 is actuated to re-apply the clamp 55. At the conclusion of this indexing operation one revolution of the cam shaft 68 is completed. During the initial portion of the succeeding revolution, while the cam 78 is effecting infeed of the cutter, the cam 67 effects the return strokes of the index pump and motor pistons 208 and 223, this return stroke having no effect upon the work spindle which remains clamped.

Having now described the preferred embodiment of our invention, and the operation thereof, what we claim is:

1. A gear machine or the like comprising a frame, a cutter head having a cutter spindle journaled for rotation therein about a horizontal axis, a work head having a work spindle journaled for rotation therein about a horizontal axis, a first cross-slide for the cutter head adjustable horizontally with respect to the frame in a direction perpendicular to the cutter spindle axis, a second cross-slide for the work head adjustable horizontally with respect to the frame in said direction, and the cutter head being adjustable on its cross-slide in a direction perpendicular to the cutter spindle axis and inclined to the horizontal at an acute angle.

2. A machine according to claim 1 in which the work head is adjustable on said second cross-slide about a vertical axis which intersects the work spindle axis.

3. A machine according to claim 1 in which there is a sliding base movable on the frame in the direction of the cutter spindle axis, said sliding base supporting said second cross-slide for its adjustment in said direction perpendicular to the cutter spindle axis.

4. A machine according to claim 3 in which there is a fluid motor of finite stroke connected between the frame and the sliding base for moving the latter on the frame between advanced and withdrawn positions, means for adjusting one member of the frame and the sliding base with respect to the motor in the direction of the cutter axis, for thereby establishing the advanced limit position of the sliding base, a summary slide adjustable on said one member in the direction of the cutter axis, said summary slide and said one member having cooperating gage surfaces, and a gage adapted to reflect the position of the cutter tip plane with respect to the frame, said gage being adapted for simultaneous engagement with said surfaces during said adjustment of said one member with respect to the motor.

5. A machine according to claim 4 in which there is a stop adjustable on the frame in the direction of the cutter spindle axis to establish the withdrawn position of the sliding base.

6. A machine according to claim 5 in which there is a valve means arranged to restrict the rate of displacement of said motor as the latter approaches the advanced limit position thereof, and another valve means arranged to restrict the rate of displacement of the motor as the sliding base approaches the withdrawn limit position thereof established by said stop.

7. A gear machine or the like comprising a frame having a cutter spindle rotatable thereon, a work-carrying sliding base movable on the frame in the direction of the axis of the spindle, a fluid motor of finite stroke connected between the frame and the sliding base for moving the latter on the frame between advanced and withdrawn positions, means for adjusting one member of the frame and the sliding base with respect to the motor in the direction of the cutter axis, for thereby establishing the advanced limit position of the sliding base, and a summary slide adjustable on said one member in the direction of the cutter axis, said summary slide and said one member having cooperating gage surfaces thereon.

8. A machine according to claim 7 having a reference surface on the cutter head, and a transfer gage adapted to simultaneously contact said surface and the tip surface of a cutter on said spindle and also adapted to simultaneously contact said cooperating gage surfaces on said summary slide and said one member, whereby said adjustment of said one member with respect to the motor may be made to reflect the distance between the cutter tip surface and said reference surface and to also reflect the adjusted position of the summary slide on said one member.

9. A gear machine or the like comprising a work head having a work spindle journaled for rotation therein, an index mechanism for said spindle including a first reciprocating fluid motor, a chamfering tool and a slide supporting the same, said slide being movable with respect to the work head to carry the chamfering tool toward and away from a workpiece on the spindle, a second reciprocating fluid motor for actuating said slide, first and second fluid pumps connected respectively to the first and second motors for driving the latter in time therewith, and a common drive for said pumps.

10. A machine according to claim 9 in which there is a cutter head support, a cutter head having a cutter spindle journaled for rotation therein, said cutter head being mounted for reciprocation on the cutter head support in the direction of the cutter axis, said common drive being mounted on the cutter head and including means reacting against the cutter head support for effecting said reciprocation in time with operation of said first and second fluid motors.

11. A machine according to claim 9 in which the second fluid motor comprises a piston mounted for reciprocation in a cylinder in the slide at an angle to the direction of slide motion, and the machine further comprises a cam and a cam follower of which one member is carried by the piston and the other member is stationary with respect to the work head.

12. A gear machine according to claim 11 in which the cam has a dwell effective during the terminal portion of each stroke of the piston.

13. A gear machine or the like comprising a frame, a cutter head having a cutter spindle journaled therein for rotation about a horizontal axis, a work head having a work spindle journaled therein for rotation also about a horizontal axis, two cross-slides independently adjustable horizontally in parallel paths on the frame, said cross-slides respectively supporting the cutter head and the work head, and one of said heads being adjustable on its cross-slide in the same vertical plane that the latter is adjustable on the frame but in a direction inclined to the horizontal at an acute angle.

14. A gear machine or the like comprising a frame, a cutter head having a cutter spindle journaled therein for rotation about a horizontal axis, a work head having a work spindle journaled therein for rotation also about a horizontal axis, a cross-slide supporting one of said heads and adjustable horizontally on the frame in a direction perpendicular to the axis of the cutter spindle, a sliding base supporting the work head and being adjustable and movable on the frame in the direction of said axis, the work head being adjustable about a vertical axis to thereby adjust the angularity between the axis of the work spindle and the cutter spindle, and the cutter head being adjustable in a direction perpendicular to the cutter axis and inclined to the horizontal at an acute angle.

15. A gear machine or the like comprising a frame on which a work head and a support for a cutter head are mounted, the work head and cutter head respectively journaling a work spindle and a cutter spindle for rotation therein, the cutter head being reciprocable on its support in the direction of the cutter spindle axis, a chamfering tool and slide supporting the same, the slide being reciprocable on the cutter head to carry the chamfering tool toward and away from a workpiece on the work spindle, a drive mounted on the cutter head and including means reacting against the cutter head support for reciprocating the cutter head, an index mechanism for the work spindle including a first reciprocating fluid motor, a second reciprocating motor for reciprocating said slide, and first and second reciprocating fluid pumps mounted on the cutter head and operated by said drive, said pumps being connected by fluid lines respectively to the first and second motors for driving them in time with each other and with reciprocation of the cutter head.

16. A machine according to claim 15 in which there is a cam and cam follower connecting the second reciprocating fluid motor with the slide, the cam having a dwell effective during the terminal portion of each stroke of the reciprocation of the motor.

References Cited in the file of this patent

UNITED STATES PATENTS

| | | |
|---|---|---|
| 1,932,781 | Hill | Oct. 31, 1933 |
| 2,006,790 | Condon | July 2, 1935 |
| 2,063,414 | Tweddell | Dec. 8, 1936 |
| 2,101,544 | Isler | Dec. 7, 1937 |
| 2,184,232 | Christman | Dec. 19, 1939 |
| 2,187,992 | Wildhaber et al. | Jan. 23, 1940 |
| 2,504,968 | Eklund | Apr. 25, 1950 |
| 2,607,234 | McFerren | Aug. 19, 1952 |
| 2,634,657 | Aschwanden | Apr. 14, 1953 |
| 2,725,792 | Wildhaber | Dec. 6, 1955 |
| 2,739,501 | Becker et al. | Mar. 27, 1956 |
| 2,797,799 | Ehlert | July 2, 1957 |